United States Patent
Paugam

(10) Patent No.: US 8,677,278 B2
(45) Date of Patent: Mar. 18, 2014

(54) PACKAGE DATA FORMAT

(75) Inventor: Olivier Paugam, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 1010 days.

(21) Appl. No.: 12/184,928

(22) Filed: Aug. 1, 2008

(65) Prior Publication Data

US 2010/0031197 A1    Feb. 4, 2010

(51) Int. Cl.
*G06F 3/14*    (2006.01)

(52) U.S. Cl.
USPC ............... 715/853; 715/700; 719/328; 705/8; 702/19; 716/3; 716/8; 709/220; 382/159

(58) Field of Classification Search
USPC .......... 715/200–277, 700–867; 707/200–206; 709/201–229
See application file for complete search history.

(56) References Cited

U.S. PATENT DOCUMENTS

| | | | |
|---|---|---|---|
| 7,350,180 B1 * | 3/2008 | Slavin | 716/103 |
| 7,555,757 B2 * | 6/2009 | Smith et al. | 719/328 |
| 7,639,868 B1 * | 12/2009 | Regli et al. | 382/159 |
| 2001/0034873 A1 * | 10/2001 | Arsintescu | 716/8 |
| 2006/0129441 A1 * | 6/2006 | Yankovich et al. | 705/8 |
| 2008/0005287 A1 * | 1/2008 | Harvey et al. | 709/220 |
| 2008/0059077 A1 * | 3/2008 | Zhou et al. | 702/19 |

* cited by examiner

*Primary Examiner* — Ruay Ho
(74) *Attorney, Agent, or Firm* — Gates & Cooper LLP

(57) ABSTRACT

A method, apparatus, and data structure provide the ability to author and maintain assets in a computer system. Assets belonging to disconnected applicative fields are defined and represented in a hierarchical structure. The structure includes data (i.e., physical resources), nodes that act as a container for the data and other nodes, and constructs that establish a template that defines a contextual structural view for the data and nodes. The constructs are bound to the data and nodes and access is provided to the assets to a user using a computer and display.

22 Claims, 3 Drawing Sheets

PACKAGE DATA FORMAT

BACKGROUND OF THE INVENTION

1. Field of the Invention

The present invention relates generally to the electronic representation of data in a computer, and in particular, to a method, apparatus, and article of manufacture for accessing, editing, and persisting arbitrary large datasets of heterogeneous assets.

2. Description of the Related Art

Graphic and non-graphic computer data may be represented in a variety of ways and used in a variety of different programs/applications and in different contexts. Some computer assets/objects may have common attributes or properties regardless of whether such assets/objects are used in the same application, different applications, or different contexts. However, rather than having a single universal definition of the asset/object that is represented throughout applications and contexts, the prior art often creates separate and independent representations of each asset/object for every application and every context (e.g., within a single application). Such prior art techniques can consume a significant amount of memory/disk space and require excessive processing time for its manipulation and use. Alternative prior art methodologies create a large aggregated version of all assets/objects at a single time. However, such methodologies require the creator to imagine all versions of the assets/objects in advance, are not flexible, and utilize significant memory and processing. These problems may be better understood with a detailed explanation of prior art data representations and use.

Computer applications often have proprietary data formats for different applications. For example, one proprietary format may cover two-dimensional (2D) graphics, another format covers three-dimensional (3D) graphics, and another format covers design metadata. Each format may cover data that is similar but has a slightly different appearance depending on the application field and context around which the data is interpreted. For example, a 2D circle and 3D circle may be represented by two different versions of the same entity—one in 2D and one in 3D. Such independent versions are too heavy and complex to maintain. Prior art techniques create a large aggregated version of the data in advance. Thus, with the circle example, the prior art would create a large aggregation of 2D circles and 3D circles, 2D circles with a weight, and 3D circles with a weight, 2D circles with color, 3D circles with color, etc. Such an aggregation is exponentially complex and consumes substantial memory/disk space/processing.

An example of a prior art technique is the FBX™ application programming interface (API) available from the assignee of the present invention. The FBX™ API is a platform-independent 3D authorizing and interchange format supported by various software developers. However, while the format may be flexible, the FBX™ API targets the exchange of 3D scenes for the entertainment and game industry (i.e., it is game centric and does not allow extension to 2D or computer-aided design assets). The FBX™ API also fails to maintain an open data-format and relies on C++ APIs for coherency.

Another prior art data format is the COLLADA™ application available from SONY™. The COLLADA™ application is a collaborative design activity for establishing an interchange file format for interactive 3D applications. The COLLADA™ application defines an open standard XML schema for exchanging digital assets among various graphics software applications that might otherwise store their assets in incompatible formats. However, the COLLADA™ application is a generic application that lacks strong data typing and is therefore unable to provide fine grained data access. Further, the COLLADA™ application lacks any stable C++ reference implementation thereby increasing the difficulty of its use.

Alternative prior art exchange formats are focused on 3D assets and lack the ability to describe other applicative knowledge.

SUMMARY OF THE INVENTION

One or more embodiments of the invention provide a method, apparatus, data structure, and article of manufacture for authoring, maintaining, processing, displaying, etc. heterogeneous assets in a computer system. The structure of such assets are, explicitly separated from the attributes of the assets. Accordingly, embodiments of the invention are not focused on a specific applicative domain (e.g., 3D scenes). Further, assets can be shared across applications without having to (a) duplicate them to match a specific context (e.g., a 2D line versus a 3D line), or (b) redefine them whenever there is a change to their attributes (e.g., adding a new dashing style).

The representation of the assets is organized hierarchically in layers (ranging from generic to specific). Any consumer understanding the lowest level will be able to make sense of any data to some extent, even if authored by another application. Embodiments of the invention further strongly defines the layout of its data, thus allowing fine-grained access and caching. Further, the assets are not bound to any specific storage implementation, and may be mapped to various underlying implementations (e.g., relational databases, open packaging conventions [OPC] container, web service, etc.).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a common way to express and use electronic assets across multiple different products. Embodiments allow publishers to control their data and edit it by hand if needed by ensuring the data format is well documented and human-readable with reason (while maintaining a relatively simple syntax).

Embodiments of the invention also express data payload both in a binary form and a human-readable form, depending on the application needs. The format serves various applications/customers (e.g., AUTOCAD™, REVIT™, INVENTOR™, MAYA™ [all of which are available from the assignee of the present invention]) by providing a middle ground, both from a 2D and 3D perspective. Application specific concepts can be carried through opaque streams (data), or abstract entities (for instance a specific algorithm). Embodiments of the invention are also scalable such that the data format is flexible enough to accommodate technological innovation (e.g., hardware shading support) and data scalability is provided from a careful data-modeling rather than brute force.

Performance based on the data is provided through multiple aspects of the data format. In this regard, the data format may focus on a basic set of generic concepts, while specifically tuned acceleration data-structures can be built on top of the basic set. In addition, embodiments improve performance by separating data into a content (textures, meshes, attributes) and its structure (scene DAG [directed acyclic graph]). Further, a consumer does not need to load, parse and process content data to figure out how the scene appears visually. The scene structure is capable of being organized in a hierarchical fashion to avoid bottlenecks on very complex assemblies. Rendering content (mesh simplification, texture correction, content indexing, etc.) may also be batch processed without requiring an inefficient DAG traversal. Further, storage performance, for instance physical file size, may be achieved using specific compression techniques (quantization for numerical quantities, geometry compression for meshes, etc). Embodiments of the invention provides that the data format is extensible to carry the information needed to run such algorithms.

Hardware and Software Environment

Figure 1:
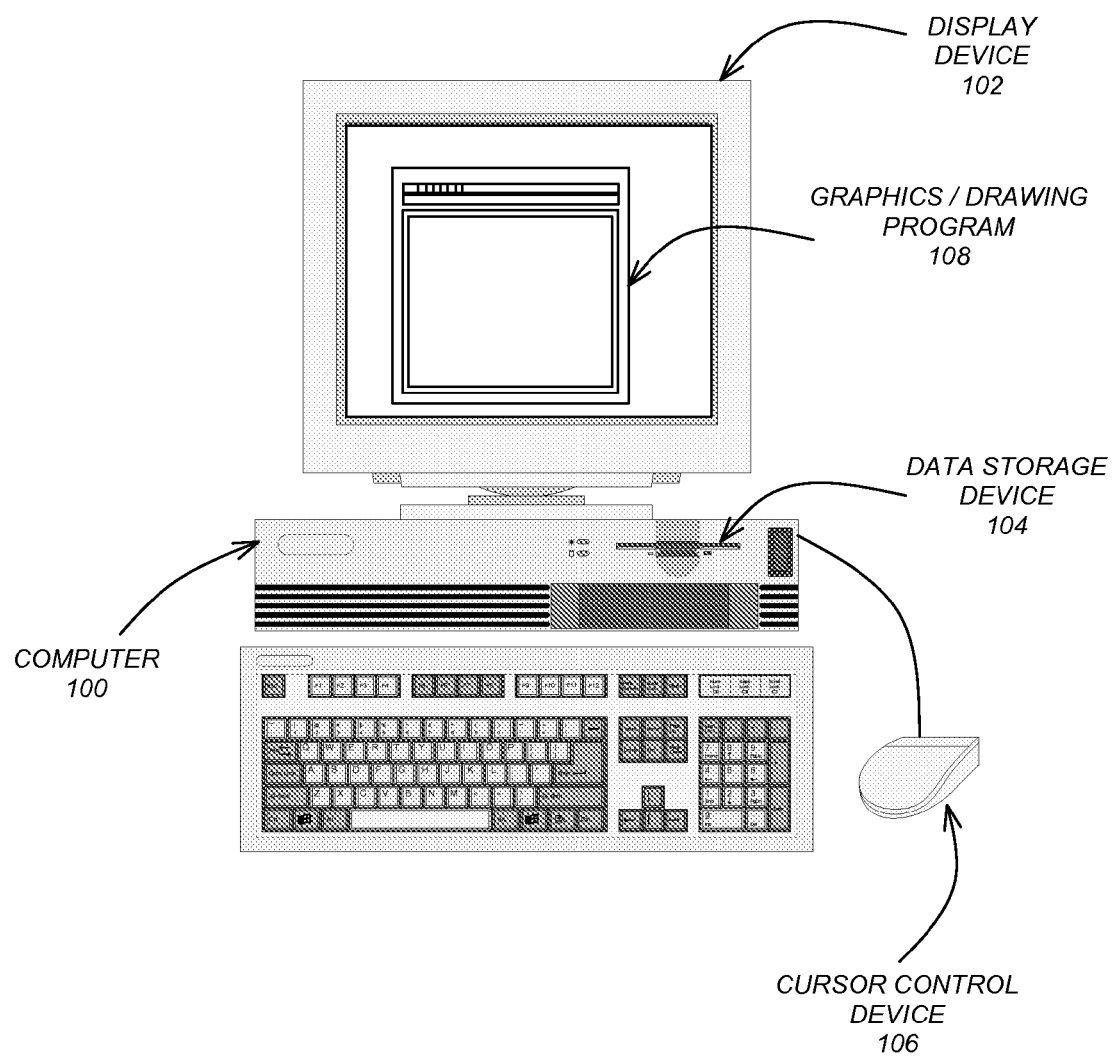
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 1 is not intended to limit the present invention. Indeed, those skilled in the art will recognize that other alternative environments may be used without departing from the scope of the present invention.

Detailed Software Overview

Embodiments of the invention are implemented in a graphics/drawing program 108 executing within computer 100. Various unique capabilities are provided by program 108 including the ability to: (1) author heterogeneous assets; (2) establish a common understanding of specialized assets, and (3) access, edit, and persist arbitrary large datasets.

As used herein, the term "assets" includes 2D drawings, 3D scenes, material information, CAD (computer aided design) metadata, objects, geometry, or any type of data/process of an application in either a graphical or non-graphical context. The ability to author heterogeneous assets (both graphic and non graphic) is provided in an open, human-readable and structured way. As used herein, "heterogeneous assets" include a description of data and processes belonging to disconnected application fields, such as 3D geometry for a game and manufacturer information for CAD parts.

To establish a common understanding of specialized assets, structural information is separated from attributes. As used herein, "specialized assets" include a description of data and processes scoping very specific work-flows, such as photo-realistic rendering materials or inverse kinematics.

Embodiments of the invention provide the ability to access, edit, and persist arbitrary large datasets, without memory limitations. As used herein, "arbitrary large datasets" include datasets where the bottleneck is not the amount of main memory but storage (hard-disk or database): typically datasets in the gigabyte or terabyte range.

Embodiments of the invention are meant to be the common way to express assets (2D drawings, 3D scenes, material information, CAD metadata, etc) and gives users the ability to use these collections of assets in a variety of products. In addition, by separating structure and attributes, different applications can develop libraries of contextual design data while sharing common knowledge. For instance, all geometric primitives used across applications can be described at once, while the context in which they are instantiated (games, CAD, 2D floor-plans, etc.) can vary. As used herein, "common knowledge" means more sharing, re-usability and data recycling across applications. In this regard, since data is fully self described, an application will be able to make at least sense of the structure of assets authored with a different application.

Detailed Software Embodiments

One or more embodiments of the invention provide a data format (XML based syntax or otherwise) for defining application data ("assets") with various characteristics including a simple, self-descriptive asset layout, abstract structural definitions, strong and extensible data typing, structural and contextual binding, and application data reusability. Each of these characteristics are described in detail below.

Simple, Self-Descriptive Asset Layout

Assets may be represented as graphs of container elements (referred to hereafter as a "node") and data chunks (referred to hereafter as "data"). Such a graph may be cyclic and it's up to the publisher of the asset to enforce constraints. Further, elements used to represent the node and data may be nested or referenced ("link") to express instantiation. Accordingly, the node element is the basic structural atom and several nodes may be combined into a graph to express higher-level abstractions. The link element is a pointer to another element and may be used within a node element or a trait element (see below).

The "data" element is an access point to raw payload, providing caching and paging capabilities. Data elements must be typed and may either point to a design resource in a package or embed XML payload. Further, the data element cannot nest other structural elements, but may be nested inside a node or pointed to by a link.

TABLE 1 illustrates an example of the XML syntax that may be used to represent nodes and data in accordance with one or more embodiments of the invention:

TABLE 1

```
<Data id="A"/>
<Node id="B"/>
    <Node id="C">
        <Data id="D"/>
        <Link to="A"/>
    </Node>
    <Node id="E"/>
</Node>
```

Data may be stored as binary chunks and referenced from the XML or directly embedded in the XML as CDATA (character data)(i.e., data that is marked for the parser to interpret as only character data and not markup data). For instance some 3D coordinates could be expressed in two ways as illustrated in Table 2.

TABLE 2

```
<Data type="3D points">
    1.,0.5,1.
    1.,1.89,0.
    .5,.5,.5
    10.,2.3,2.3
</Data>
<Data type="3D points" src="../points.bin"/>
```

As illustrated in Table 2, the 3D points can be directly embedded as CDATA wherein the points are specified via coordinate sets. Alternatively, the points may be stored as binary chunks and referenced from the XML at the "src" location specified.

The ability is to express data in either binary or plain text is key for fine tuning the balance between readability and performance. Heavyweight data can be stored in a compact binary form, while lightweight, descriptive data may be fully readable. In this regard, as used herein, "heavyweight data" refers to textures, geometry, or any information that requires substantial amount of storage space/memory. Similarly, "lightweight data" refers to data that does not require substantial storage space/memory (e.g., description data, attributes for nodes, etc.).

In addition, the format does not make any assumption about the underlying storage implementation: the binary data might live in a flat file, a relational database or a file server for instance.

Abstract Structural Definitions

Application specific concepts ("constructs"), for instance a polygon mesh, are only expressed in terms of structure and do not carry any contextual information (the position of the mesh). Such contextual data (color, dimension, position, rendering style, etc.) is explicitly separated from the structural definitions.

The construct is a template describing how a consumer is supposed to make sense of the data at runtime. The construct may be hints on where to look for specific data, or invariants such as the degree of a polygon mesh or some semantic.

The use of constructs allows the factoring of common knowledge and re-use of it for various application fields without having to refine the format. For example, 2D and 3D primitives can be factored once into their abstract definition (a line for instance) and then instantiated using contextual data (2D or 3D positions, color, etc.). In another example, a triangle mesh could be described by its degree (3), its vector data, and its vector indices. The "construct" template, as set forth in Table 3, could assign tags to the vectors and indices so that, at runtime, the consumer could look for the appropriate data.

TABLE 3

```
<Construct id="my mesh">
    <Mesh>
        Primitive deg="3" vtx="VECTORS" tri="INDICES"/>
    </Mesh>
</Construct>
```

As illustrated in Table 3, as part of the construct entitled "my mesh", tags are assigned as primitives to a mesh.

Table 4 illustrates the same construct used to describe a polyline:

TABLE 4

```
<Construct id="my lines">
    <Mesh>
        Primitive deg="1" vtx="POINTS"/>
    </Mesh>
</Construct>
```

As illustrated in Table 4, the construct entitled "my lines" is used to assign tags for points on an asset of a single degree (i.e., a line).

Similar to Tables 3 and 4, Table 5 illustrates a construct template used to define a rendering light. In this regard, a rendering light could be described by whether the light has a spot target or not:

TABLE 5

```
<Construct id="my light">
    <Light target="TARGET"/>
</Construct>
```

As illustrated in Table 5, the construct template entitled "my light" assigns a "TARGET" tag for a light target which will be used at runtime.

Strong and Extensible Data Typing

Data is strongly typed using basic attributes. Attributes are named, typed (using the usual 32 and 64 bit integral types) and may be arrays. Thus, an attribute element defines a named and typed quantity. An optional dimension may also be specified (e.g., to define static arrays). For example, a 4×4 single-precision floating point matrix may be represented by a single attribute as illustrated in Table 6:

TABLE 6

```
<Attr id="matrix" type="SCALAR" dim="16"/>
```

In Table 6, a single attribute called "matrix" is typed as scalar with 16 dimensions (i.e., a 4×4 matrix).

Several attributes may be grouped into one set referred to herein as a "trait". Several traits may reference the same attributes (sharing of attributes). In this regard, traits can be used to group together attributes sharing the same functionality (e.g., positioning or color). Thus, a trait element acts as an attribute set, grouping together one or more attributes or traits. For instance, an application may want to define some entity with a name and a 2D position as illustrated in Table 7:

TABLE 7

```
<Attr id="name" type="STRING"/>
<Attr id="2D position" type="SCALAR" dim="2"/>
<Trait id="myentity trait">
    <Link to="name">
    <Link to="2D Position">
</Trait>
```

As illustrated in Table 7, the name and 2D position attributes are grouped together in the my entity trait. The decoupling between traits and attributes allows users to extend and version their contextual data without having to redefine it from scratch.

Attributes and traits are self-descriptive and may represent any application field. Since attributes may be shared between traits, attribute libraries may be built to allow data recycling. Since the data layout is uniquely defined by these traits, it allows precise input/output (I/O) and loading on demand. Thus all data is fully cacheable and does not need to be loaded at once.

In addition, an enumeration element may be used to specify key/value pairs for attributes of type "enumeration".

Structural and Contextual Binding

Figure 2:
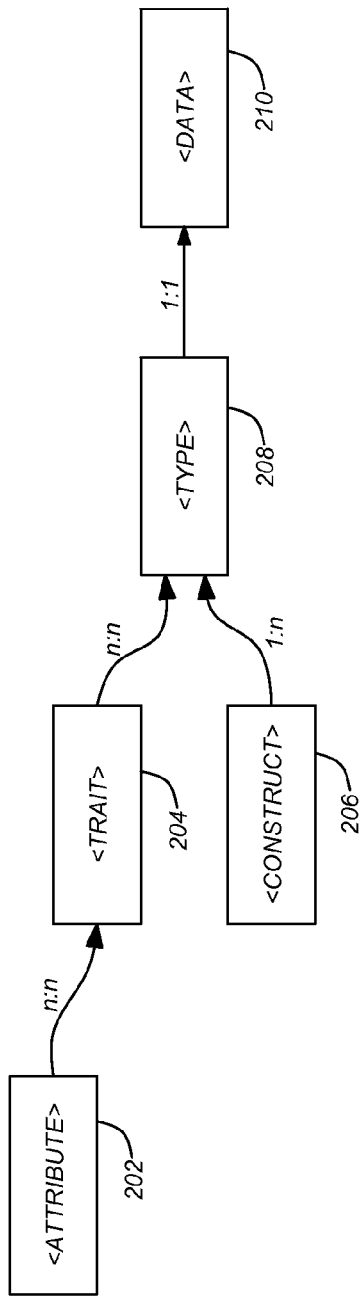
FIG. 2 illustrates the structural and contextual binding that may be used in accordance with one or more embodiments of the invention.

Several traits and constructs may be bound together to define a "type". A type completely defines a given entity or piece of data, both with contextual information (e.g., color, position, etc.) and structure (e.g., light, mesh, etc.). FIG. 2 illustrates the structural and contextual binding that may be used in accordance with one or more embodiments of the invention. As illustrated, multiple attributes 202 may be defined and mapped to multiple traits 204 (i.e., a n:n based relationship between attributes 202 and traits 204). Traits 204 and constructs 206 can be bound together to define multiple different types 208 which are used to define data 210. Further, multiple types can be used to define a trait (i.e., a n:n relationship between traits 204 and types 208).

For instance a 2D polyline could be described as set forth in Table 8:

TABLE 8

```
<Construct id="polyline" >
    <Mesh>
        <Primitive deg="1" vtx="POITNS"/>
    </Mesh>
</Construct>
<Attr id="2D Position" type="SCALAR" dim="2"/>
<Trait id="2D point">
    <Link to="2D position">
</Trait>
<Type id="polyline" trait="2D point" construct="polyline">
```

As illustrated in Table 8, a construct 206 is used to define a polyline (similar to that described above). A single 2D position attribute 202 is defined. Further, a 2D point trait 204 (that is linked to the 2D position attribute 202) is defined. The polyline construct 206 and 2D point trait 204 are then bound together to define the polyline type 208.

The data 210 may then be instantiated by nodes nesting some data with the appropriate type and role as illustrated in Table 9:

TABLE 9

```
<Node id="my polyline" type="polyline">
    <Data type="polyline" role="POINTS">
        1.,0.5
        1.,1.89
        .5,.5
        10.,2.3
    </Data>
</Node>
```

In Table 9, the my polyline node is typed as a polyine having several sets of 2D points. Accordingly, the data 210 node is instantiated with actual data. Additional attributes can easily be added. For example, Table 10 illustrates the XML that can be used to add a color attribute:

TABLE 10

```
<Attr id="color" type="STRING"/>
<Trait id="2D point and color">
    <Link to="2D position">
    <Link to="color">
</Trait>
<Type id="polyline 2" trait="colored 2D point" construct="polyline">
    <Node id="my other polyline" type="polyline 2">
        <Data type="polyline 2" role="POINTS">
            1.,0.5 "blue"
            1.,1.89 "red"
            .5,.5 "green"
            10.,2.3 "yellow"
        </Data>
    </Node>
```

As illustrated in Table 10, the color attribute (of type STRING) is first defined. Thereafter, the "2D point and color" trait is linked to the 2D position attribute and color attribute. The XML then defines "polyline 2" as a colored 2D point. The "my other polyline" node is used to instantiate the polyline 2 suing various specified data points and colors.

Application Data Reusability

The binding between data and structure allows the representation of any possible asset and avoids redundancy. For example, a line may be defined in 2D and 3D by using two types that reference the same construct.

The data format is split into three layers ranging from basic building blocks (level-0), to common structural entities (level-1) and application specific entities and data (level-2). The lowest level ("level-0") is a small set of basic, all-purpose elements. These elements form an XML "assembly language" which can be used to craft more complex content. Accordingly, each level uses elements for the previous levels, so that any consumer understanding level-0 syntax can make sense to some extent of data authored with level-1 or level-2 syntax.

Figure 3:
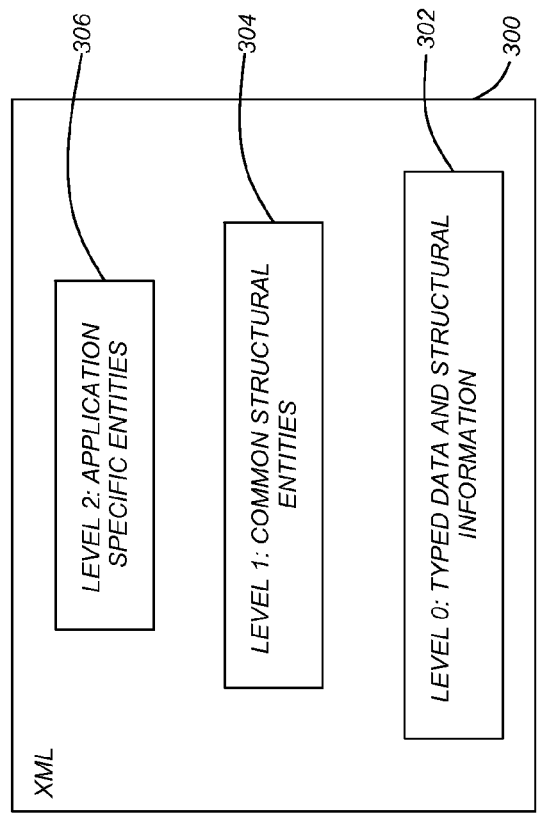
FIG. 3 illustrates a breakdown of the XML syntax into three (3) stacked levels in accordance with one or more embodiments of the invention.

FIG. 3 illustrates a breakdown of the XML syntax into three (3) stacked levels in accordance with one or more embodiments of the invention.

Level-0 302 of the XML 300 is used to represent typed data and structural information. Level-0 302 contains the basic graph elements (node, data, link) plus the typing elements (attribute, trait, type, construct). Thus, level-0 302 represents the lowest level of knowledge needed to represent application data/describe some asset (for instance a 3D rendering scene [e.g., a scene graph] or a set of CAD manufacturer specifications). It allows defining typed data entities and linking them together. The typing elements define the realization of the data (for instance the fact that some object has a "color" attribute made of three integers). The organizational elements define the structure of the data (e.g., the fact that a "circle"

entity has one "center" and one "radius"). The storage elements define raw data payloads and how they are stored.

The construct element is the only way to embed higher-level elements inside level-0 302 content. In other words, level-0 302 provides a data typing system, a way to represent data payload and a foundation to build a structured set of data. Level-0 302 is application neutral and acts just as an information carrier. For example, 2D or 3D coordinates may be expressed using level-0 302. Further, level-0 302 is not intended to be extended. In addition, level-0 302 elements may also be nested into trees, following the XML structure 300. The corresponding C++ objects maintain this parenting relationship, forming a graph.

Typing elements in level-0 302 allow defining simple atomic types, grouping them together, and binding them to some level-1 304 entity. The typing static and cannot be changed dynamically at runtime. Examples of typing element include <Attribute>, <Enum>, <Trait>, and <Type>.

The next level in the XML 300 is level-1 304 which contains common structural entities across multiple application fields (e.g., camera, door, cylinder, etc.). For instance level-1 304 may contain geometric primitives (lines, circles), rendering concepts (lights, cameras) or data-model entities (properties, external references). Stated in other terms, level-1 304 provides a set of application-specific "templates", which, combined to the level-0 302 syntax, defines a structural view on the data (e.g., a circle having s a center and a radius [2D or 3D]). Level-1 304 can also be extended as new concepts have to be introduced.

The construct element is a placeholder for level-1 304 elements. The construct element is referenced from a "type" element so that the corresponding level-1 304 element may be used to interpret content (e.g., node and data) using the specified type. In addition, a given type may refer to several constructs. Further, constructs can be seen as interpretation logic that will turn a given set of level-302 elements into a higher-level abstraction. They are fundamental when multiplexing several pieces of information into the same XML tree. For instance, the same XML tree could both be interpreted as a rendering light and as a metadata property datable.

Level-2 306 of XML 300 contains application specific entities (i.e., entities for a specific application field) (e.g., light shader, wall material specs, inverse kinematics, games, etc.). In this regard, level-2 306 is a combination of pre-defined level-0 302/1 304 XML content, plus a set C++ objects providing a unified view on the content. Pre-defined XML content may provide is a set of shared applications (e.g., useful for a particular field). Level-2 can be extended as needed.

In view of the above, a front-end "application" library is a top level set of C++ objects, simplifying operations on the underlying level-2 APIs.

Specific Runtime Implementation Advantages

In view of the above, a reference implementation of the data-format described above may utilize C++ data-runtime. Such an implementation allows parsing, querying, creating, and committing to disk such an XML syntax.

In one or more embodiments, the C++ data runtime is a graph of C++ objects wrapping around the XML entities and maintaining all of their constraints and internal data. All instances are keyed by a unique name and may be looked up at any time. Incomplete XML syntax (e.g., referencing an unknown entity) is handled transparently and late resolution of dangling references is possible.

The runtime also defines interfaces to cache data to main-memory, so that users don't need to implicitly load a complete dataset when the users need to work on some specific part of the data. In this regard, a data element may act internally as paged cache, fetching blocks of data from its binary payload resource. If a reference to an outside file is not specified (e.g., in the form of a "src" attribute), the entire payload may be assumed to be located in cache. A caching algorithm may allow the user to specify a per-cache watermark, beyond which blocks of data (i.e., one or more data-lines stored as a continuous byte array) will be elected to be written back to the resource to save memory. The size of the block of data can also be determined at runtime. However, the user may provide a hint (e.g., using a <Type> "blksize" attribute) which the runtime will try to match as closely as possible.

To enable interoperability (e.g., between applications), a set of generic, all-purpose XML definitions may be defined and maintained. Such definitions may describe the common knowledge for a given entity/vendor/manufacturer and any application intending to share data may build its own representation on top of defined entities. Such definition could, for instance, describe how a 3D vertex should be organized and what attributes it should have.

To use the definitions, integrators link against the C++ runtime and load the common asset definitions. Users may then author their own XML data through the runtime and save it to disk. Consuming applications follow the same path and use the runtime to parse and explore the data.

Logical Flow

Figure 4:
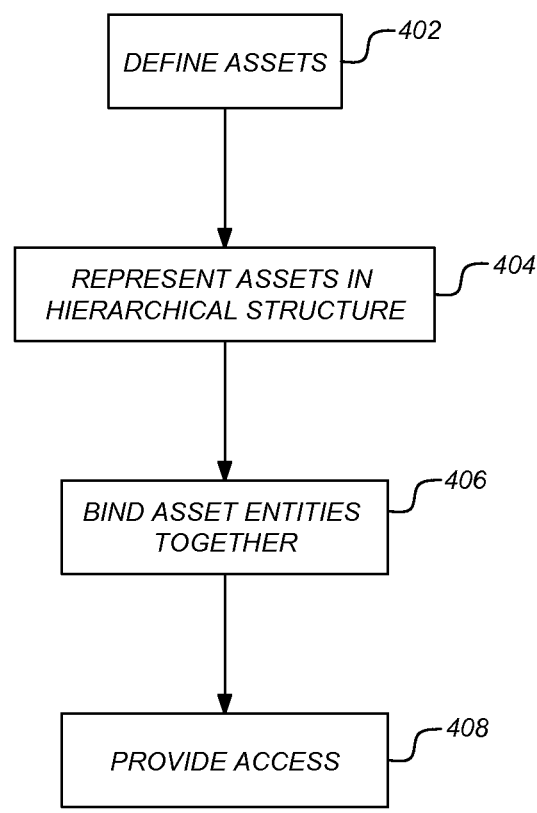
FIG. 4 illustrates the logical flow for authoring and maintaining assets in a computer system in accordance with one or more embodiments of the invention.

FIG. 4 illustrates the logical flow for authoring and maintaining assets in a computer system in accordance with one or more embodiments of the invention. At step 402, one or more assets belonging to disconnected applicative fields are defined. In other words, a determination/selection is made with respect to heterogeneous assets.

At step 404, those defined assets are represented in a hierarchical structure/data structure. Such a structure consists of data comprising physical resources, one or more nodes that each comprises a container for data and/or other nodes, and one or more constructs. Each construct is a template defining a contextual structural view for the data and nodes.

The data/physical resources may be stored as a binary chunk that is referenced from the hierarchical structure. Alternatively, the data may be directly embedded in the hierarchical structure. Further, the data may be cached to main-memory. The data may also be typed using an attribute element that defines a named and typed quantity. A trait element may further group together multiple (e.g., two or more) attributes.

The hierarchical structure may be defined using XML and object oriented programming may utilize object wrapping around the XML entities to maintain constraints and internal data.

At step 406, the different asset entities are bound together. For example, one or more of the constructs may be bound to the data and one or more nodes. Further, a combination of constructs, data, and nodes that are bound together may be defined/established/pre-defined (i.e., a pre-defined or established set of asset information) for a specific application.

At step 408, access to the assets in the hierarchical structure is provided to a user using a computer (e.g., that includes a display).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to author and maintain multiple heterogeneous assets in a unique and simple manner. The data structure in which the assets are represented separates the physical attributes/resources from the structure. Accordingly, attributes and data can be used in different applicative fields without needing to rebuild or maintain separate assets for each application.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for authoring and maintaining heterogeneous design assets in a computer system, comprising:
    (a) defining one or more heterogeneous design assets belonging to disconnected applicative fields, wherein:
        (i) the disconnected applicative fields comprise a computer-aided design field and a computer graphics field; and
        (ii) the one or more heterogeneous design assets comprise data/processes of an application;
    (b) representing the one or more heterogeneous design assets in a hierarchical structure wherein a structure of the heterogeneous design assets is separated from one or more contextual attributes of the heterogeneous design assets, the hierarchical structure comprised of:
        (i) data comprising the one or more contextual attributes, wherein the one or more contextual attributes define a context within which the one or more heterogeneous design assets are instantiated; and wherein the context is the application/applicative field in which the one or more heterogeneous assets are used/instantiated;
        (ii) one or more nodes, wherein each node comprises a container for the data and/or other nodes; and
        (iii) one or more constructs, wherein each construct comprises a template defining a structural view for the data and the one or more nodes, and wherein the one or more constructs do not carry contextual information;
    (c) binding one or more of the constructs to the data and one or more of the nodes, wherein such binding defines a representation of the one more heterogeneous design assets with contextual information and structure; and
    (d) providing access, to said heterogeneous design assets in the hierarchical structure, to a user using a computer and display, wherein the heterogeneous design assets are usable across different products in the disconnected applicative fields.

2. The method of claim 1, further comprising storing the data as a binary chunk that is referenced from the hierarchical structure.

3. The method of claim 1, wherein the data is directly embedded in the hierarchical structure.

4. The method of claim 1, wherein the data is typed using an attribute that defines a named and typed quantity.

5. The method of claim 4, wherein the hierarchical structure further comprises a trait that groups together two or more attributes.

6. The method of claim 1, further comprising defining a combination of one or more constructs, data, and one or more nodes that are bound together for a specific application.

7. The method of claim 1, wherein:
    the hierarchical structure is defined using an extensible markup language (XML); and
    object oriented programming utilizes object wrapping around entities in the XML to maintain constraints and internal data.

8. The method of claim 1, further comprising caching the data to main-memory.

9. An apparatus for authoring and maintaining heterogeneous design assets in a computer system comprising:
    (a) a computer having a memory;
    (b) an application executing on the computer, wherein the application is configured to:
        (i) define one or more heterogeneous design assets belonging to disconnected applicative fields, wherein the disconnected applicative fields comprise a computer-aided design field and a computer graphics field, and wherein the one or more heterogeneous design assets comprise data/processes of the application;
        (ii) represent the one or more heterogeneous design assets in a hierarchical structure wherein a structure of the heterogeneous design assets is separated from one or more contextual attributes of the heterogeneous design assets, the hierarchical structure comprised of:
            (1) data comprising the one or more contextual attributes, wherein the one or more contextual attributes defines a context within which the one or more heterogeneous design assets are instantiated; and wherein the context is the application/applicative field in which the one or more heterogeneous assets are used/instantiated;
            (2) one or more nodes, wherein each node comprises a container for the data and/or other nodes; and
            (3) one or more constructs, wherein each construct comprises a template defining a structural view for the data and the one or more nodes, and wherein the one or more constructs do not carry contextual information;
        (iii) bind one or more of the constructs to the data and one or more of the nodes wherein such binding defines a representation of the one more heterogeneous design assets with contextual information and structure; and
        (iv) provide access, to said heterogeneous design assets in the hierarchical structure, to a user using said computer, wherein the heterogeneous design assets are usable across different products in the disconnected applicative fields.

10. The apparatus of claim 9, wherein the application is further configured to store the data as a binary chunk that is referenced from the hierarchical structure.

11. The apparatus of claim 9, wherein the data is directly embedded in the hierarchical structure.

12. The apparatus of claim 9, wherein the data is typed using an attribute that defines a named and typed quantity.

13. The apparatus of claim 12, wherein the hierarchical structure further comprises a trait that groups together two or more attributes.

14. The apparatus of claim 9, wherein the application is further configured to define a combination of one or more constructs, data, and one or more nodes that are bound together for a specific application.

15. The apparatus of claim 9, wherein:
the hierarchical structure is defined using an extensible markup language (XML); and
object oriented programming utilizes object wrapping around entities in the XML to maintain constraints and internal data.

16. The apparatus of claim 9, wherein the application is further configured to cache the data to main-memory.

17. A computer readable medium encoded with a hierarchical structure for maintaining heterogeneous design assets hierarchically in a computer system, the data structure comprising:
  (a) data comprising one or more contextual attributes, wherein the one or more contextual attributes defines a context within which the heterogeneous design assets are instantiated; and wherein the context is an application/applicative field in which the one or more heterogeneous assets are used/instantiated;
  (b) one or more nodes, wherein each node comprises a container for data and/or other nodes; and
  (c) one or more constructs, wherein each construct comprises a template defining a structural view for the data and the one or more nodes, and wherein the one or more constructs do not carry contextual information; and
wherein:
  the one or more heterogeneous design assets are represented in a hierarchical structure wherein a structure of the heterogeneous design assets is separated from one or more contextual attributes of the heterogeneous design assets;
  one or more of the constructs, the data, and one or more of the nodes are bound together;
  such binding defines a representation of the heterogeneous design assets with contextual information and structure;
  the heterogeneous design assets are usable across different products in disconnected applicative fields;
  the disconnected applicative fields comprise a computer-aided design field and a computer graphics field; and
  the heterogeneous design assets comprise data/processes of the application.

18. The computer readable medium of claim 17, wherein the data is stored as a binary chunk that is referenced from the data structure.

19. The computer readable medium of claim 17, wherein the data is directly embedded in the data structure.

20. The computer readable medium of claim 17, wherein the data is typed using an attribute that defines a named and typed quantity.

21. The computer readable medium of claim 20, wherein the data structure further comprises a trait that groups together two or more attributes.

22. The computer readable medium of claim 17, wherein:
  the data structure is defined using an extensible markup language (XML); and object oriented programming utilizes object wrapping around entities in the XML to maintain constraints and internal data.

* * * * *

UNITED STATES PATENT AND TRADEMARK OFFICE
CERTIFICATE OF CORRECTION

PATENT NO. : 8,677,278 B2  
APPLICATION NO. : 12/184928  
DATED : March 18, 2014  
INVENTOR(S) : Olivier Paugam Page 1 of 1

It is certified that error appears in the above-identified patent and that said Letters Patent is hereby corrected as shown below:

On the Title Page, item (54) and in the Specification, Column 1, line 1, please insert --DESIGN-- in the beginning of the title, as it should read in its entirety:

"DESIGN PACKAGE DATA FORMAT".

Signed and Sealed this
First Day of July, 2014

Michelle K. Lee
*Deputy Director of the United States Patent and Trademark Office*